(12) United States Patent
Chen et al.

(10) Patent No.: US 8,270,429 B2
(45) Date of Patent: Sep. 18, 2012

(54) METHOD OF COMMUNICATING WITHIN A MESH NETWORK

(75) Inventors: Ye Chen, Elk Grove Village, IL (US); Stephen P. Emeott, Rolling Meadows, IL (US); Hrishikesh Gossain, Lake Mary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 378 days.

(21) Appl. No.: 11/844,561

(22) Filed: Aug. 24, 2007

(65) Prior Publication Data

US 2009/0052463 A1 Feb. 26, 2009

(51) Int. Cl.
*H04L 12/413* (2006.01)
(52) U.S. Cl. ...................................................... 370/447
(58) Field of Classification Search .......... 370/442–447, 370/458, 461, 462, 345, 347, 348, 395.4
See application file for complete search history.

(56) References Cited

U.S. PATENT DOCUMENTS

| | | | |
|---|---|---|---|
| 6,570,883 B1 | 5/2003 | Wong | |
| 6,778,536 B1 | 8/2004 | Ofek et al. | |
| 7,061,925 B2 | 6/2006 | Joshi | |
| 2003/0033394 A1* | 2/2003 | Stine | 709/222 |
| 2004/0264397 A1 | 12/2004 | Benveniste | |
| 2005/0195828 A1* | 9/2005 | Klein et al. | 370/395.4 |
| 2006/0098611 A1 | 5/2006 | Joshi et al. | |
| 2006/0098612 A1 | 5/2006 | Joshi et al. | |
| 2006/0223541 A1* | 10/2006 | Famolari | 455/450 |
| 2007/0060141 A1 | 3/2007 | Kangude et al. | |
| 2008/0126824 A1* | 5/2008 | Lee et al. | 713/502 |
| 2008/0144493 A1* | 6/2008 | Yeh | 370/230 |

FOREIGN PATENT DOCUMENTS

| | | |
|---|---|---|
| WO | 2005025244 A2 | 3/2005 |
| WO | 2009029467 A2 | 3/2009 |
| WO | 2009029467 A3 | 3/2009 |

OTHER PUBLICATIONS

C. Zhu .et al.: A Five-Phase Reservation Protocol (FPRP) for Mobile Ad Hoc Networks—10 Pages.

(Continued)

*Primary Examiner* — Kwang B Yao
*Assistant Examiner* — Tung Q Tran
(74) *Attorney, Agent, or Firm* — Randi L. Karpinia; Kenneth A. Haas

(57) ABSTRACT

A method of communicating within a mesh network comprises scheduling a mesh access reservation time period for transmission of one or more frames by the mesh device on a channel. During the scheduled mesh access reservation time period: contention for the channel is performed with one or more other mesh devices in the network; and at least one frame is transmitted when the mesh device wins the contention. After the scheduled mesh access reservation time period: when one or more frames scheduled for transmission during the scheduled mesh access reservation time period remain to be transmitted; contention for the channel continues; and the one or more frames are transmitted when the mesh device wins the contention for the channel and when another mesh device has not reserved the channel for the time period.

19 Claims, 8 Drawing Sheets

OTHER PUBLICATIONS 9.91 HCF Contention-based channel access (EDCA); pp. 80-85; IEEE 802.11e-2005—IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 8: Medium Access Control (MAC) Quality of Service Enhancements).

9.2 DCF; pp. 256-257; IEEE 802.11-2007—IEEE Standard for Information technology—Telecommunications and information exchange between systems—Local and metropolitan area networks—Specific requirements; Part 11: Wireless LAN Medium Access Control (MAC) and Physical Layer (PHY) specifications.

Ye Chen, Steve Emeott, MDA Simulation Study: Robustness to non-MDA Interferers', IEEE submission 802.11-07/356r0, 20 pages—Mar. 2007.

Emma Carlson et al, A Distributed End-to-End Reservation Protocol for IEEE 802.11-Based Wireless Mesh Network; IEEE Journal, vol. 24, No. 11, pp. 2018-2027—Nov. 2006.

International Preliminary Report on Patentability and Written Opinion for Counterpart International Patent Application No. PCT/US2008/073804 mailed on Mar. 4, 2010.

Office Action mailed on Mar. 18, 2011 in Counterpart European Patent Application No. 08798334.2.

Office Action mailed on Sep. 13, 2011 in Counterpart European Patent Application No. 0879334.2.

English Translation of Office Action mailed on Nov. 24, 2011 in Counterpart Korean Patent Application No. 10-2010-7066334.

English Translation of Notice of Allowance mailed on Jun. 13, 2012 in Counterpart Korean Patent Application No. 10-2010-7006334.

PCT International Search Report and Written Report Application No. PCT/US2008/073804—Dated Mar. 27, 2009—23 pages.

C. Zhu et al.: A Five-Phase Reservation Protocol (FPRP) for Mobile Ad Hoc Networks—10 pages, Feb. 1998.

IEEE 802.11: "Joint See-Mesh/Wi-Mesh Proposal to 802.11 TGs" Internet Citation Dated Feb. 28, 2006, XP002504090—166 pages.

Y. Chen et al.: Scheduled Mesh Access Mechanism for an IEEE 802.11 Mesh Networks—Dated Mar. 31, 2008—6 pages.

* cited by examiner

METHOD OF COMMUNICATING WITHIN A MESH NETWORK

FIELD OF THE INVENTION

The present invention relates generally to communication networks, and more particularly to methods for communicating within a mesh network.

BACKGROUND

An "ad hoc network" refers to a self-configuring network of nodes connected by wireless links which form an arbitrary topology. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. One characteristic of the nodes is that each node can directly communicate over a short range with nodes which are a single "hop" away. Such nodes are sometimes referred to as "neighbor nodes." A large network can be realized using intelligent access points (IAP) which provide wireless nodes with access to a wired backhaul.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through communication with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), nodes periodically send HELLO messages (e.g., once per second) that contain routing and metrics information associated with the route to its bound intelligent access point (IAP), and discover certain peer routes on-demand.

A key aspect for optimal performance of a mesh network is controlling and coordinating the transmissions from different devices to minimize interference and collisions among the devices of the mesh network. One method defined in the Institute of Electrical and Electronics Engineers (IEEE) 802.11 standard includes a collision avoidance feature known as request to send (RTS) and clear to send (CTS). (see: http://standards.ieee.org/getieee802/index.html or contact the IEEE at IEEE, 445 Hoes Lane, PO Box 1331, Piscataway, N.J. 08855-1331, USA) In this method, when RTS and CTS control signals are exchanged between a transmitter and a receiver, devices within range of the transmitter and the receiver defer from accessing the channel until the transmission is complete. This method is vulnerable to interference during the transmission of the RTS and CTS control signals and is not as effective when some transmitters in the network emit signals at a much lower power level than others. Additionally, it is generally not employed when the frames being transmitted (e.g. voice frames) are of short duration compared to the control signal.

Another method is defined in United States Patent Application Publication Number 20070060141 to Kangude et al, entitled "Mesh Deterministic Access," which was published on Mar. 15, 2007. This application describes a method to coordinate the transmissions of mesh devices in a mesh network using a distributed schedule. A transmission scheduled is established between two mesh devices when the devices identify an unreserved period of time, called a Mesh Deterministic Access (MDA) opportunity (MDAOP), during which other mesh devices are not scheduled to transmit. Once median MDAOP is identified, both devices advertise the selected MDAOP, allowing nearby devices to avoid this period of time when making their own reservations. A device making a reservation as a transmitter must start and complete its transmissions during the reserved period of time. The transmitter uses a special set of contention parameters and a special channel access function to access the media during its MDAOP. The MDAOP owner is not allowed to use the special set of contention parameters nor the special channel access function outside its MDAOP. This method fails to address several practical issues including: how the mesh point (MPS) may transmit outside an MDAOP in the event of a busy channel, how the MP may retransmit outside the MDAOP, and how to protect the MP against transmissions from non-MDA devices.

United States Patent Application Publication Number 20040264397, to Benveniste et al, entitled "Power-saving mechanism for periodic traffic streams in wireless local-area networks," published on Dec. 30, 2004, teaches a method of establishing a periodic schedule between an access point and one or more of the stations associated with the access point. Once a schedule is established, both the access point and the station buffer traffic for the each other until the scheduled transmission period arrives, and only then may both begin to transmit. This method is not effective when more than one access point exists in the network because it does not teach how to coordinate the scheduling operation between access points.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
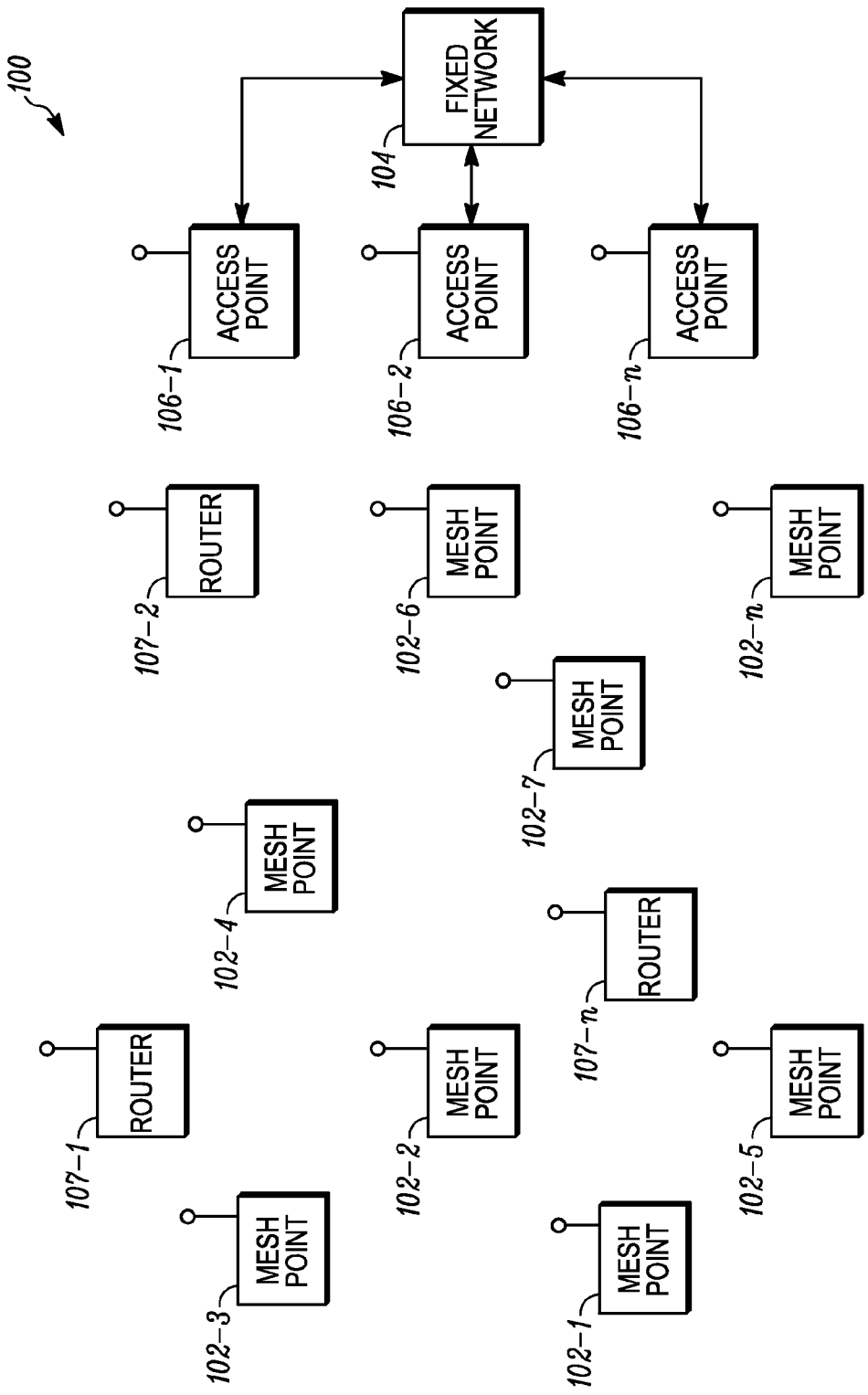
FIG. 1 is a block diagram illustrating an example of a communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to communicating among a plurality of nodes within a mesh network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of communicating among a plurality of nodes in a mesh network described herein. The non-processor circuits may include, but are not limited to, a radio receiver, a radio transmitter, signal drivers, clock circuits, power source circuits, and user input devices. As such, these functions may be interpreted as steps of a method of communicating among a plurality of nodes in a mesh network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Any embodiment described herein is not necessarily to be construed as preferred or advantageous over other embodiments. All of the embodiments described in this Detailed Description are illustrative provided to enable persons skilled in the art to make or use the invention and not to limit the scope of the invention which is defined by the claims.

In a wireless local area network (WLAN) mesh, the number of interfering transmissions that simultaneously occur on wireless channel could be reduced if devices had perfect knowledge of when each other was going to transmit. Without this knowledge, devices that are hidden from each other may attempt to use the channel at the same time or during overlapping intervals, thereby causing each other interference and reducing the possibility that transmissions are successfully received. A practical means of controlling and coordinating the transmissions from different devices in a mesh and preventing devices from transmitting at the same time is needed, especially when the devices are another not within range of one another. Such a method would increase the capacity of a mesh network by increasing the amount of time when the wireless channel employed by the mesh is available for productive transfer of data traffic.

The present invention provides a method for mesh devices to access the wireless channel during reserved periods. The method includes transmission and retransmission procedures for mesh devices that reduce the number of interfering transmissions made by mesh points within the same neighborhood.

FIG. 1 is a block diagram illustrating an example of a communication network 100. The communication network 100 can be any ad hoc network including a mesh enabled architecture (MEA) network, an IEEE 802.11 network (i.e. 802.11a, 802.11b, 802.11g, 802.11e or 802.11s), or any other packetized mesh communication network. As used herein, the term "ad hoc network" refers to a self-configuring network of nodes connected by wireless links, the union of which form an arbitrary topology.

As illustrated in FIG. 1, the communication network 100 includes a plurality of mobile nodes 102-1 through 102-n (referred to also as mesh nodes 102, mesh points 102, nodes 102, mobile nodes 102, or mobile communication devices 102).

The communication network 100 can, but is not required to, include a fixed network 104 having a plurality of intelligent access points (IAP) 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet.

As used herein, the term "Access Point (AP)" refers to a device communicatively connected either directly (via a wired link) or indirectly (via a wireless link) to a wired network that enables remote wireless nodes to communicate with the wired network (e.g. local area network (LAN), wide area network (WAN), etc.). An AP connects wireless communication devices which are in its direct communication range (i.e. one-hop away) together to form a wireless network. In many cases, the AP connects to a wired network, and can relay data between wireless devices and wired devices. In one implementation, an AP comprises a Mesh Access Point (MAP) which has meshing capability. A MAP is distinguishable from a regular AP in that an MAP implements a mesh routing protocol such as a Mesh Scalable Routing (MSR) protocol disclosed in U.S. Pat. No. 7,061,925 B2, to Avinash Joshi, entitled "System and Method for Decreasing Latency in Locating Routes Between Nodes in a Wireless Communication Network," its contents being incorporated by reference in its entirety herein. An Intelligent Access Point (IAP) is a special MAP which connects to a wide area wired network (WAN) and can relay data between the wireless devices and the wired devices on the WAN. IAPs and MAPs can enable communication between the wired network and remote wireless nodes which are multi-hop away through the MSR and its proxy routing variant as disclosed in United States Patent Application Publication Number 20060098612, to Joshi et al, entitled "System and method for associating different types of nodes with access point nodes in a wireless network to route data in the wireless network", and United States Patent Application Publication Number 20060098611, to Joshi et al, entitled "System and method for routing data between different types of nodes in a wireless network," the contents of each being incorporated by reference herein.

The communication network 100 further can include a plurality of fixed or mobile routers 107-1 through 107-n (referred to generally as nodes 107 or communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly or indirectly. When communicating indirectly, one or more other nodes 102, 106 or 107, can operate as a router or routers for forwarding or relaying packets being sent between nodes. As used herein, the term "meshed node" refers to a communication device which has "meshing capability" meaning that a node has routing functionality and can route traffic to and from other nodes with routing functionality. Examples of meshed nodes include a mesh point (MP), a Mesh Access Point (MAP), and an intelligent Access Point (IAP).

Figure 2:
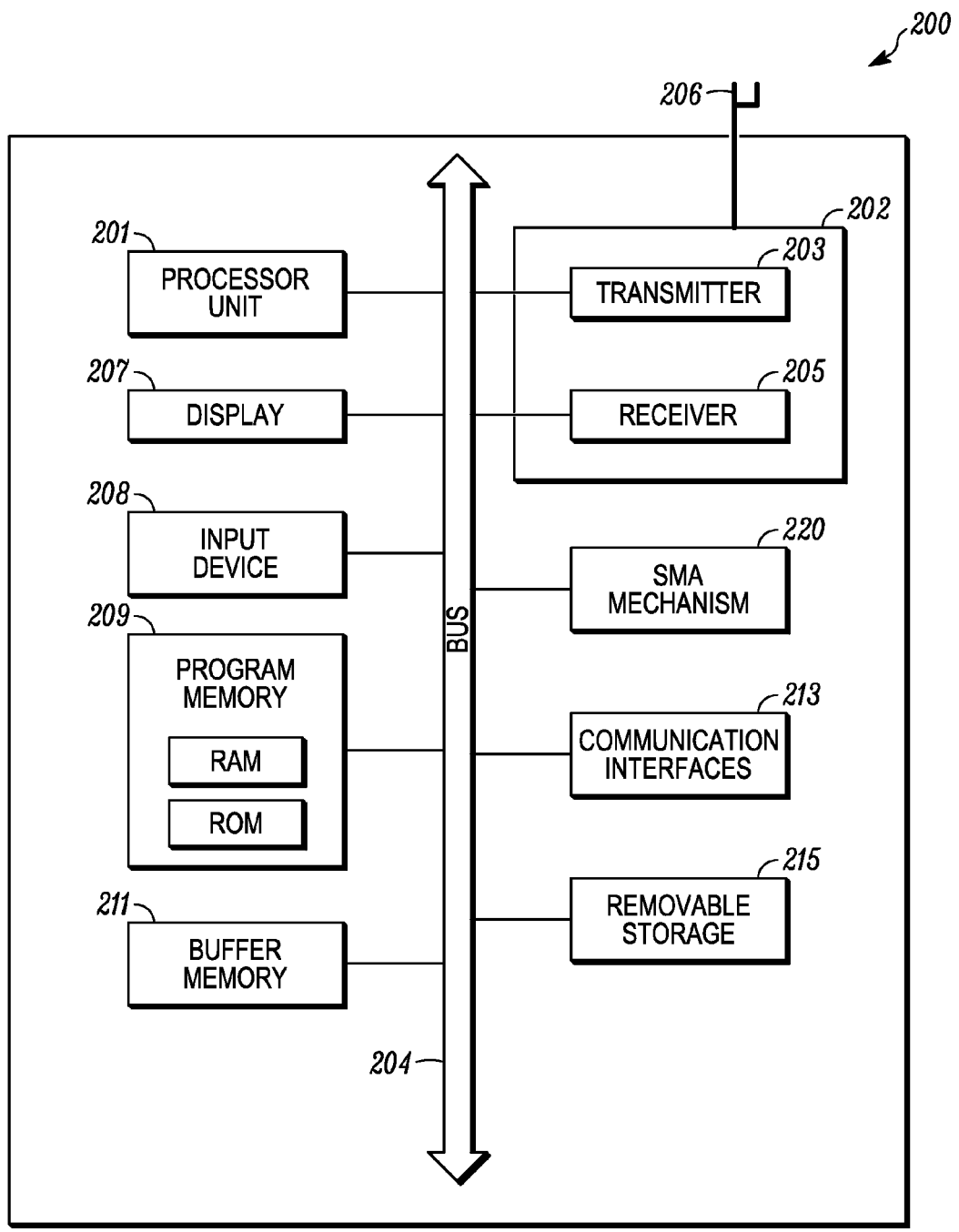
FIG. 2 is an electronic block diagram of a node for use in the operation of some embodiments of the invention.

FIG. 2 is a block diagram of a node 200. The node 200, for example can be one or more of the nodes 102, 106 or 107 of FIG. 1. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, a removable storage unit 215, and a scheduled mesh access (SMA) mechanism 220. Although not shown, the node 200 also can include an antenna switch, duplexer, circulator, or other highly isolative means (not shown) for intermittently providing information packets from the transmitter circuitry 203 to the antenna 206 and from the antenna 206 to the receiver circuitry 205. The node 200, for example, can be an integrated unit containing at least all the elements depicted in FIG. 2, as well as any other elements necessary for the node 200 to perform its particular functions. Alternatively, the node 200 can comprise a collection of appropriately interconnected units or devices, wherein such units or devices perform functions that are equivalent to the functions performed by the elements of the node 200. For example, the node 200 may comprise a laptop computer coupled to a wireless local area network (LAN) card.

The processor 201 includes one or more microprocessors, microcontrollers, DSPs (digital signal processors), state machines, logic circuitry, or any other device or devices that process information based on operational or programming instructions. Such operational or programming instructions are stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax (Worldwide Interoperability for Microwave Access), and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 can be implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of radio frequency (RF) signals from within at least one bandwidth and optionally more bandwidths, if the communications with the proximate device are in a frequency band other than that of the network communications. The receiver circuitry 205 may optionally comprise a first receiver and a second receiver, or one receiver designed to allow receiving within one or more bandwidths. The transceiver 202 includes at least one set of transmitter circuitry 203. The at least one transmitter 203 may be designed to allow transmitting to multiple devices on multiple frequency bands. As with the receiver 205, dual transmitters 203 may optionally be employed where one transmitter is for the transmission to a proximate node or direct link establishment to WLAN's and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

The scheduled mesh access mechanism 220 provides channel access for the node 200 in accordance with some embodiments of the present invention as will be described hereinafter with respect to FIG. 3.

Figure 3:
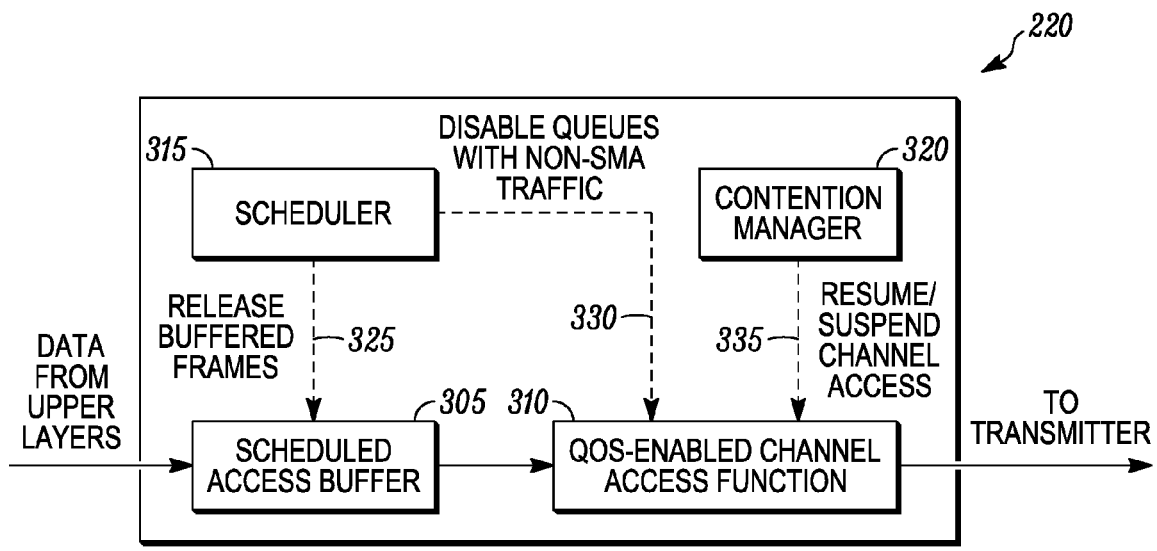
FIG. 3 is further detail of a scheduled mesh access mechanism within the node of FIG. 2 in accordance with some embodiments of the present invention.

FIG. 3 illustrates further detail of a scheduled mesh access (SMA) mechanism 220 within the node 200 of FIG. 2 in accordance with some embodiments of the present invention. As illustrated, the SMA mechanism 220 comprises a scheduled access buffer 305, a quality of service (QoS) enabled channel access function 310, a scheduler 315, and a contention manager 320. The scheduled access buffer 305 and the QoS-enabled channel access function 310 take data received from upper layers and buffer the data until its ready to be transmitted. The scheduler 315 and the contention manager 320 control when data in the buffer and the channel access function is ready to be released for transmission. A detailed description of each block is provided herein below.

The scheduled access buffer 305 receives data frames from upper layers or from neighboring mesh points (MPs), and releases these frames to the QoS enabled channel access function 310 at scheduled times. The scheduled access buffer 305 holds data frames associated with a reservation until the scheduler 315 sends a control signal indicating that a start of a reserved period has arrived. Upon receiving the control signal, the scheduled access buffer 305 releases frames associated with the reservation to the QoS enabled channel access function 310 for transmission. Frames not associated with a reservation may be forwarded directly to the channel access function without waiting for a schedule, as these frames must contend for the media during periods when no reservations have been made The scheduler 315 is responsible for issuing control signals via control lines 325 and 330 indicating when the scheduled access buffer 305 may release frames to the QoS enabled channel access function 310 and indicating when the QoS enabled channel access function 310 should suspend transmitting frames not associated with a reservation, respectively. The scheduler 315 keeps track of reservations made by the mesh point with other devices, and sends a control signal to the scheduled access buffer 305 indicating when these reservations begin. In one embodiment, when the QoS enabled channel access function 310 used Enhanced Distributed Channel Access (EDCA) defined in the 802.11e standard (see: IEEE, "Media IEEE Standard for Information technology—Telecommunications and information exchange between systems—Local and metropolitan area networks—Specific requirements Part 11: Wireless LAN Medium Access Control (MAC) and Physical Layer (PHY) specifications, Amendment 8: Medium Access Control (MAC) Quality of Service Enhancements)," Release 2005, November 2005) to arbitrate internal contention, the scheduler 315 also sends a control signal to the QoS enabled channel access function 310 to disable queues that are not affiliated with access categories or traffic streams for which the reservation has been made. At the beginning of an SMA reservation, the scheduler 315 instructs the QoS enabled channel access function 310 to disable the channel access for the non-SMA traffic to eliminate the internal contention for the SMA traffic. As a result, the SMA traffic is granted the higher priority over non-SMA traffic during its own reservation. At the end of a reservation, the scheduler 315 instructs the QoS-enabled channel access function 310 to enable the channel access for the non-SMA traffic. Another function of the scheduler 315 is to map the SMA reservation with traffic flow as well as scheduling the SMA reservation based on the neighbor mesh points' (MPs') SMA reservation information.

The contention manager 320 controls the contention of the node 200 based on the neighbor mesh points' SMA reservations. At the beginning of a neighbor mesh point's SMA reservation, the contention manager 320 sends a control signal via control line 335 instructing the QoS enabled channel access function 310 to suspend the external contention (channel access) for all traffic and consider the channel unavailable. After completion of a neighbor mesh point's SMA reservation, the contention manager 320 allows the QoS enabled channel access function 310 to resume the external contention and return to its normal operation.

The QoS enabled channel access function 310 implements the channel sensing and backoff functions that govern when the mesh point may transmit data. It may also implement internal contention to arbitrate in cases where multiple frames from different access categories are buffered to be transmitted. In one embodiment of this invention, existing channel access functions, such as those defined in the IEEE 802.11 standard, are reused with only minor modifications. For example, the QoS enabled channel access function 310 can be based upon the Enhanced Distributed Channel Access (EDCA) defined in the 802.11e standard. In accordance with the present invention, control lines 330 and 335 take inputs from the scheduler 315 and the contention manager 320, respectively, to determine when it is appropriate to disable contention because another neighboring mesh point has a reservation, or to determine when to disable one or more access categories because one access category holds traffic associated with a reserved times while others do not. It will be appreciated by those of ordinary skill in the art that the block diagram of FIG. 3 represents a high-level conceptual functions of the SMA mechanism 220 and is not intended to limit the invention to a specific implementation solution.

The present invention provides two signaling functions, namely a reservation setup and a reservation advertisement function. These two functions establish and manage the information for driving the reservation schedule and the contention manager 320, which supply control signals to the scheduled access buffer 305 and the QoS enabled channel access function 310.

Figure 4:
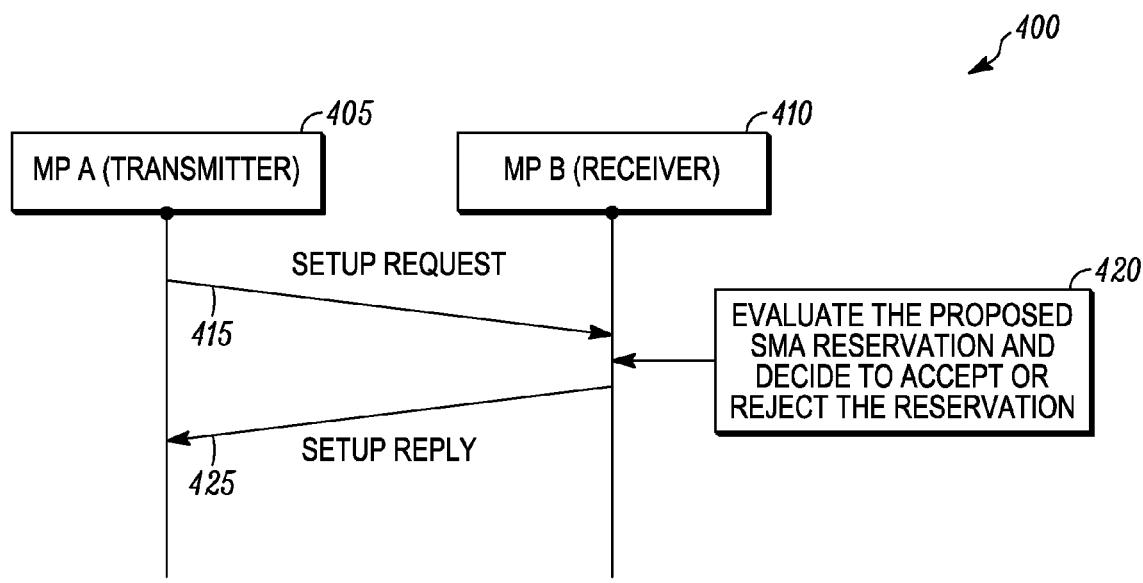
FIGS. 4 through 6 illustrate various signaling functions for the operation of the communication network of FIG. 1 in accordance with some embodiments of the present invention.

FIG. 4 illustrates one embodiment of a reservation setup 400 used to establish a mesh transmission scheduled between a transmitter node (MP-A 405) and a receiver node (MP-B 410). As illustrated in FIG. 4, when MP-A 405 requires a reservation between itself and MP-B 410, MP-A 405 issues a reservation setup request 415. The reservation setup request message 415 carries the proposed mesh transmission schedule including the start time and expected duration. The receiver MP-B 410 evaluates (block 420) the proposed reservation based on criteria such as whether the proposed reservation overlaps with any existing reservations (including those from both MP-B 410 and its neighbor MPs) or the proposed reservation will cause the loading at MP-B 410 to exceed the limit set by an admissions control function. The MP-B 410 thereafter responds with a setup reply frame with the decision, such as accept or reject, in the form of a status code.

At the transmitter MP-A 405, the reservation signaling mechanism can map a traffic flow identified by such identifications as the original node address, the destination address, the next hop address, and/or the access category or traffic stream identifier to an SMA reservation. In one embodiment of the invention, the aforementioned address information or some representation of this information is carried within the signaling frames, thereby facilitating the mapping between the reservation and a traffic flow.

The reservation advertisement is used to propagate the SMA reservation information within the mesh network. The purpose of an advertisement is to inform each MP within the vicinity of both a transmitting and a receiving device that a reservation has been established and that neighboring MPs should avoid accessing the channel during this time. This goal is accomplished using one or both of the signaling mechanisms illustrated in FIGS. 5 and 6.

Figure 5:
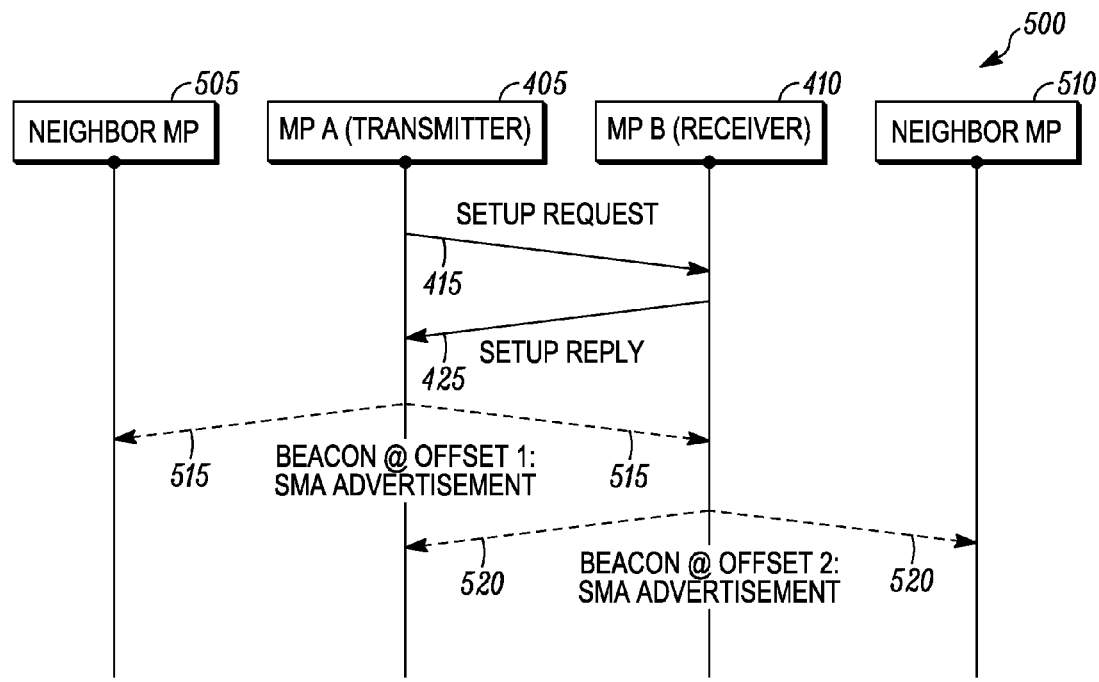

FIG. 5 illustrates one embodiment of a SMA setup signaling 500 using a beacon advertisement. In accordance with the present invention, each MP periodically broadcasts its reservation information for reservations where it is acting as either a transmitter or receiver to its neighbor MPs. For an 802.11-based mesh network, the beacon frame is generally used to achieve the periodic broadcast. For example, as illustrated in FIG. 5, MP-A 305 periodically broadcasts its reservation information 515 to its neighbors MP 505 and MP-B 310. Similarly, MP-B 310 periodically broadcasts its reservation information 520 to its neighbors MP 510 and MP-A 505.

Figure 6:
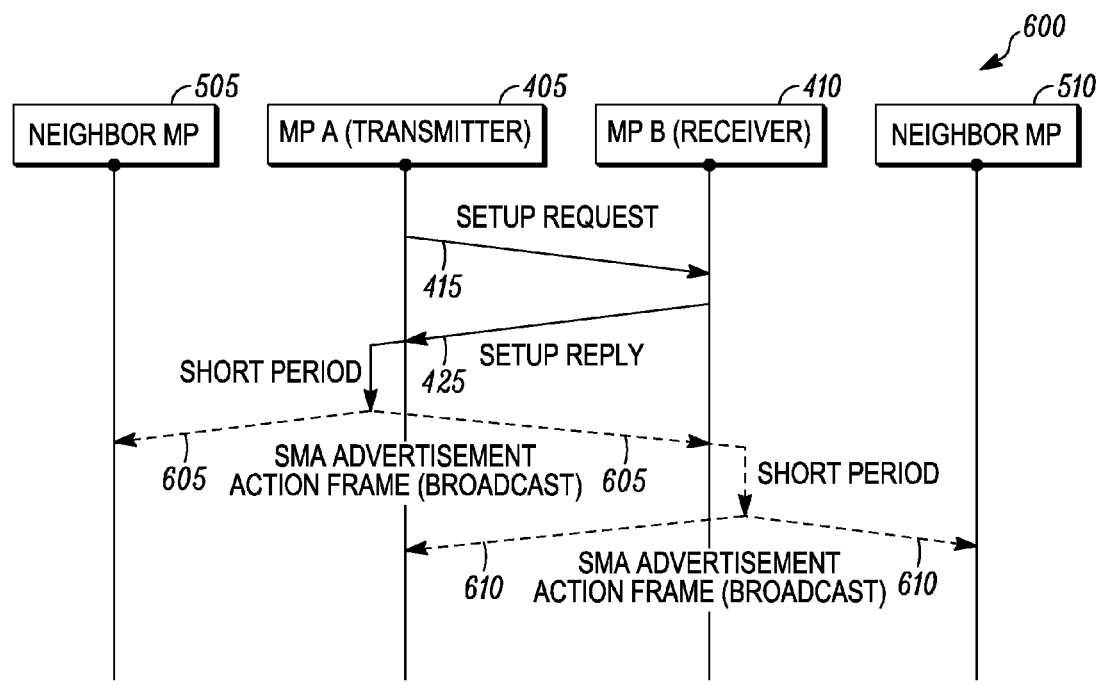

FIG. 6 illustrates one embodiment of a SMA setup signaling 600 using an immediate advertisement. In accordance with the present invention, when a new reservation is created, the new reservation information can be broadcast in a management frame called an action frame. This technique is called an immediate advertisement since both the transmitter and the receiver can try to send such actions frame immediately after the SMA setup signaling. In order to avoid colliding messages, the receiver can try to send the action frame immediately after receiving the action frame from the transmitter, subject to the availability of the channel. After receiving an SMA advertisement in either a beacon or action frame, MPs within the vicinity of both the transmitter and receiver will avoid contending for the channel during the scheduled reservation. For example, as illustrated in FIG. 6, MP-A 405 transmits an action frame to neighbor MP 505 and MP-B 410. Similarly, MP-B 410 transmits an action frame to neighbor MP 510 and MP-A 405.

When an MP finishes the transmission of a traffic stream, it is responsible to tear down the corresponding reservation. The transmitter sends a teardown frame to announce the termination of the reservation. Both the transmitter and the receiver will remove the reservation from its advertisement in either its beacon/action frames. (not shown)

Figure 7:
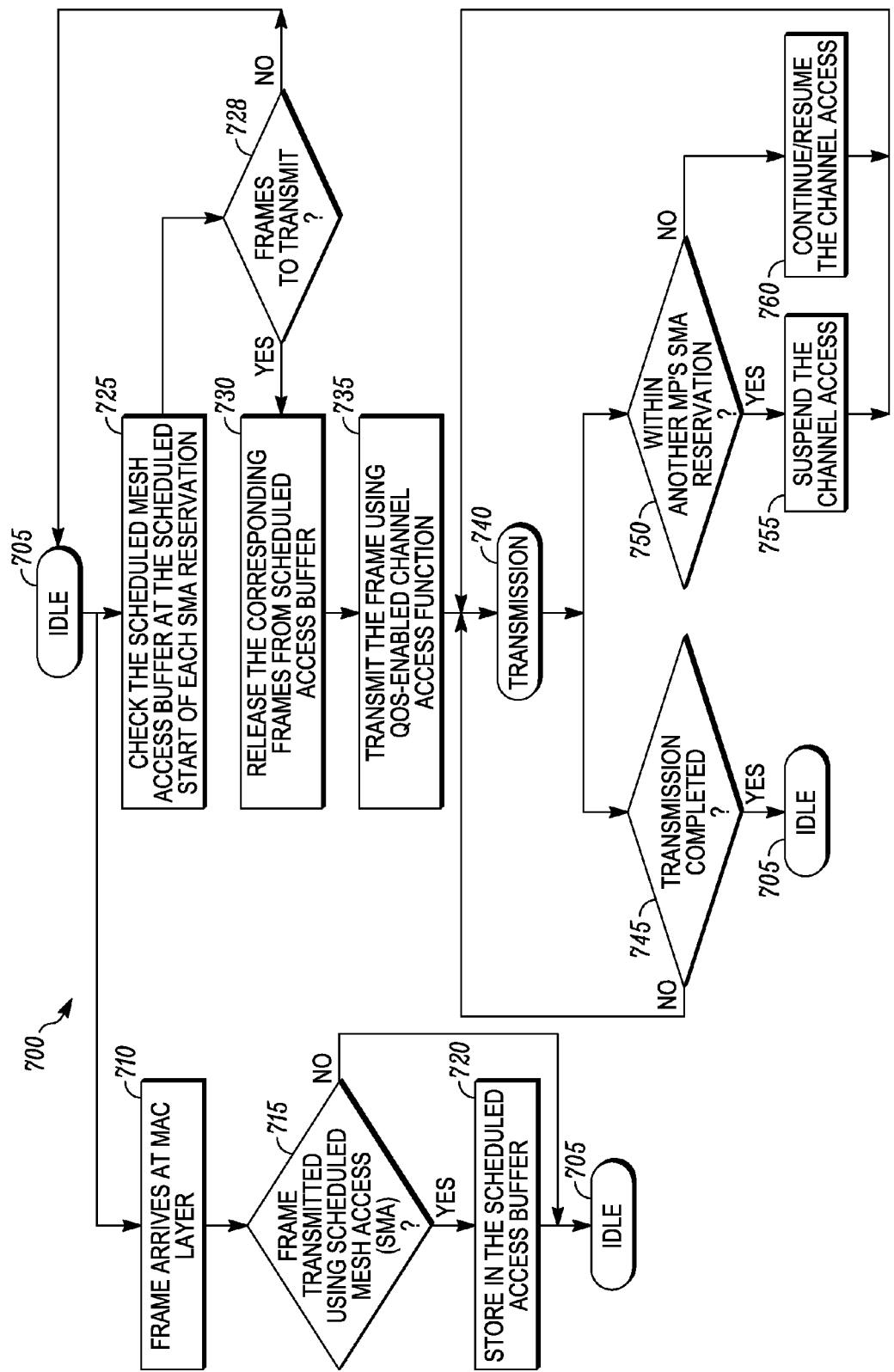
FIGS. 7 through 10 are flowcharts illustrating the operation of various devices within the communication network of FIG. 1 in accordance with some embodiments of the present invention.

FIG. 7 is a flowchart illustrating an operation 700 of a mesh device within a mesh network in accordance with some embodiments of the present invention. Specifically, FIG. 7 illustrates the operation 700 of an SMA reservation owner. As illustrated, the operation begins at Step 705 in which a mesh device is in an idle state. Next, in Step 710, a frame arrives at the MAC layer of the mesh device. Next, in Step 715, the mesh device determines whether the frame should be transmitted using scheduled mesh access (SMA). When the frame should be transmitted using SMA, the operation continues to Step 720 in which the frame is stored in the scheduled access buffer 305 of the mesh device. The operation of the mesh device then returns to an idle state of 705.

Alternatively to Steps 710 through 720, in Step 725, the mesh device checks the scheduled mesh access buffer 305 for frames to transmit at the scheduled start of each SMA reservation. Next, in Step 728, the mesh device determines if there are frames to transmit. When there are no frames to transmit, the operation cycles back to the idle state of Step 705. When there are frames to transmit, the operation continues to Step 730, in which the mesh device releases the corresponding frames from the scheduled mesh access buffer 305. Next, in Step 735, the mesh device transmits the frames using the QoS enabled channel access function. Next, in Step 740, the transmission of the frames takes place.

In one path after Step 740, in Step 745, the mesh device determines whether the transmission has been completed. When it has not been completed, the operation cycles back to Step 740 and continues transmission of the frame. When it has been completed, the operation of the mesh device returns to the idle state of Step 705.

In a second path after Step 740, in Step 750, the mesh device determines whether the transmission is within another mesh point's SMA reservation. When it is within another MP's SMA reservation, the mesh device suspends the channel access in Step 755. When it is not within another MP's SMA reservation, the mesh device continues/resumes the channel access. After both Steps 755 and 760, the operation returns to transmission of Step 740.

Figure 8:
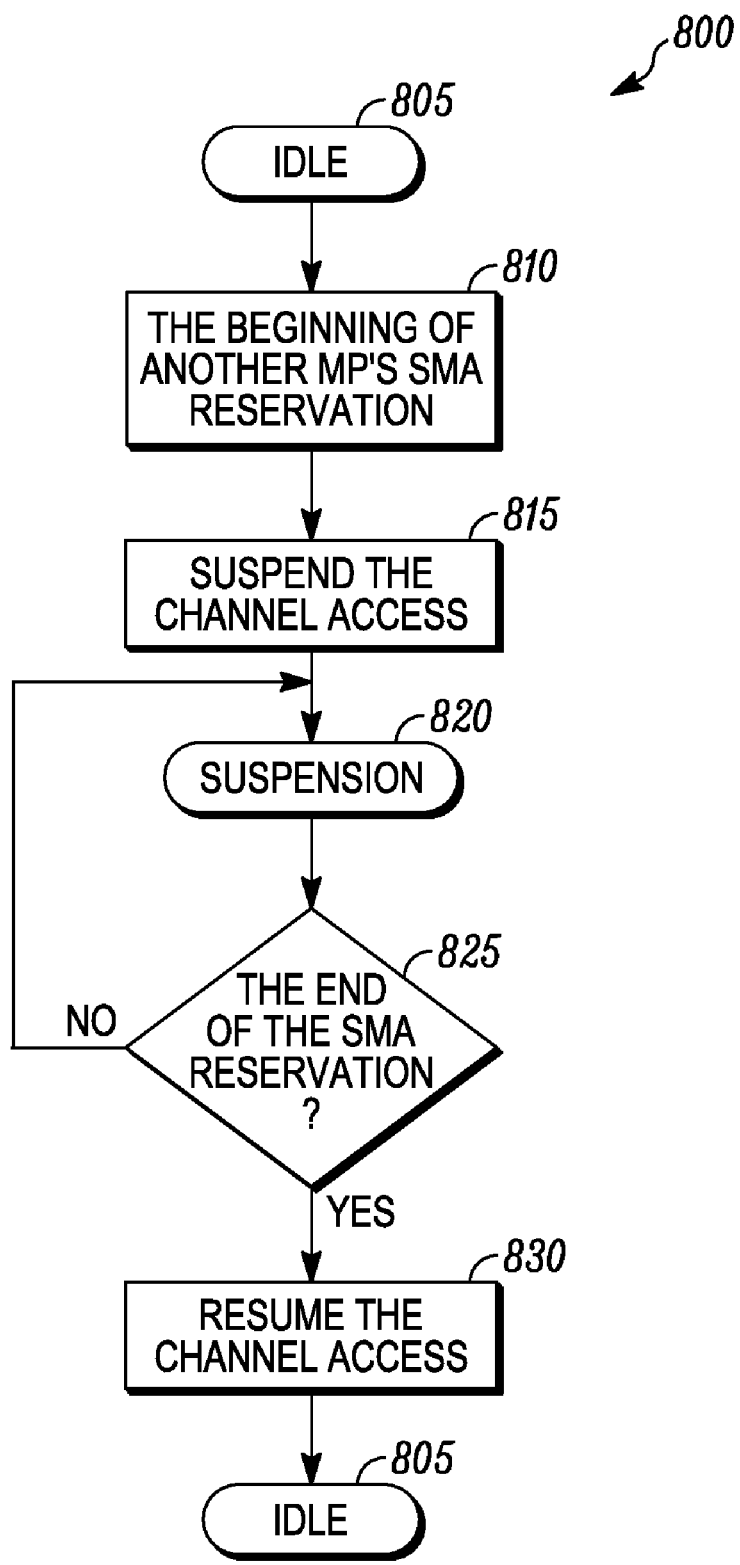

FIG. 8 is a flowchart illustrating an operation 800 of a mesh device within a mesh network in accordance with some embodiments of the present invention. Specifically, FIG. 8 illustrates the operation 800 of a non SMA reservation owner. As illustrated, the operation begins at Step 805 in which a mesh device is in an idle state. Next, in Step 810, the mesh device determines that it is the beginning of another mesh point's SMA reservation. Next, in Step 815, the mesh device suspends the channel access. In Step 820, the channel access is suspended. Next, in Step 825, the mesh device determines whether it is the end of the SMA reservation. When it is not the end of the SMA reservation, the operation cycles back to Step 820. When it is the end of the SMA reservation, the operation continues to Step 830 in which the mesh device resumes its channel access. The operation of the mesh device then returns to the idle state of Step 805.

Figure 9:
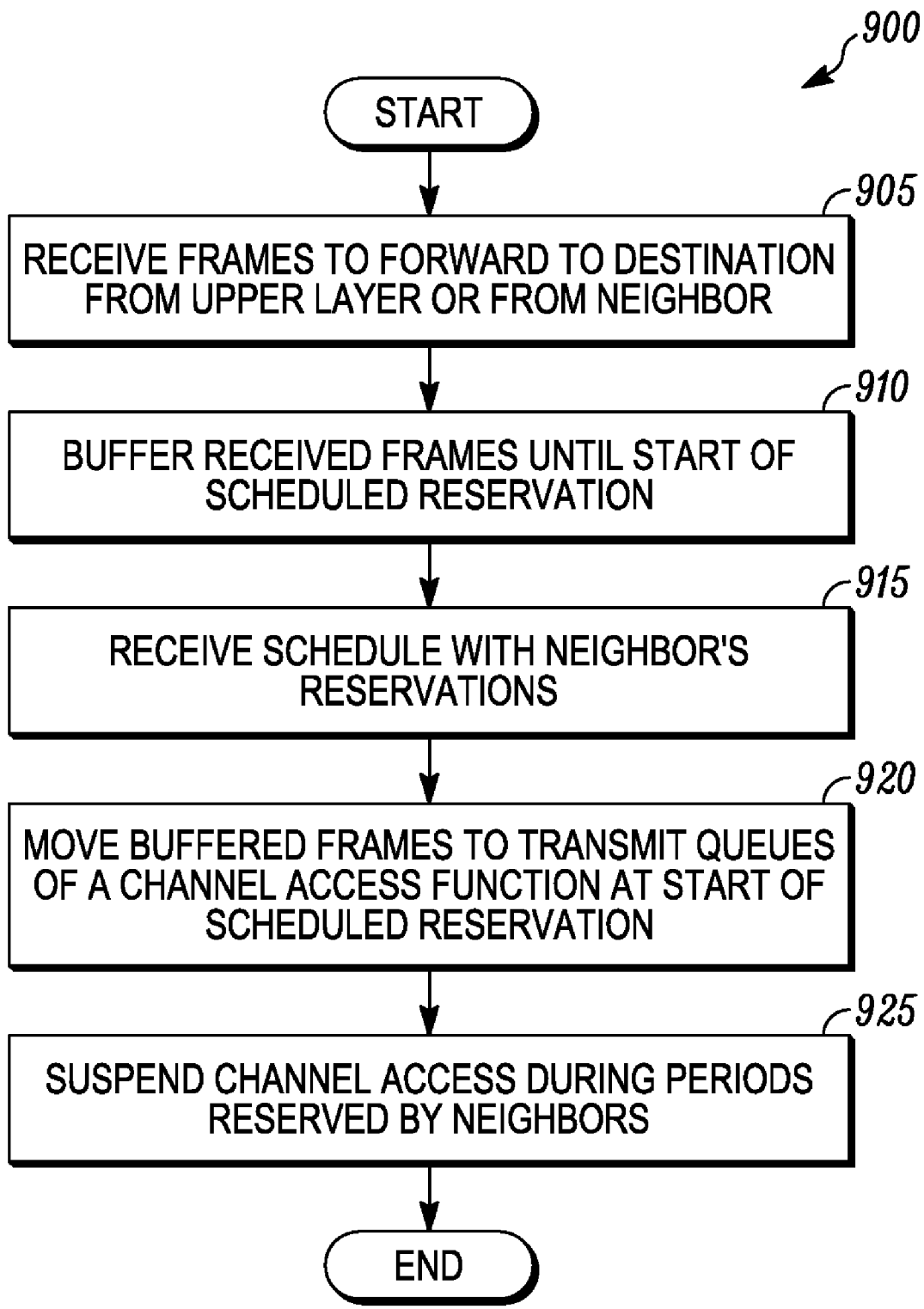

FIG. 9 is a flowchart illustrating an operation 900 of a mesh device within a mesh network in accordance with some embodiments of the present invention. Specifically, FIG. 9 illustrates the operation 900 of a mesh device in processing received frames from other devices within the network.

As illustrated, the operation 900 begins with Step 905 in which the mesh device receives frames to forward to another destination node from the upper layer or from a neighbor mesh point. Next, in Step 910, the mesh device buffers received frames until the start of each scheduled reservation. Next, in Step 915, the mesh device receives a schedule with the neighbor's reservations. Next, in Step 920, the mesh device moves buffered frames to transmit queues of a channel access function at the start of the scheduled reservation. Next, the mesh device suspends its own channel access during periods reserved by each of its neighbors.

Figure 10:
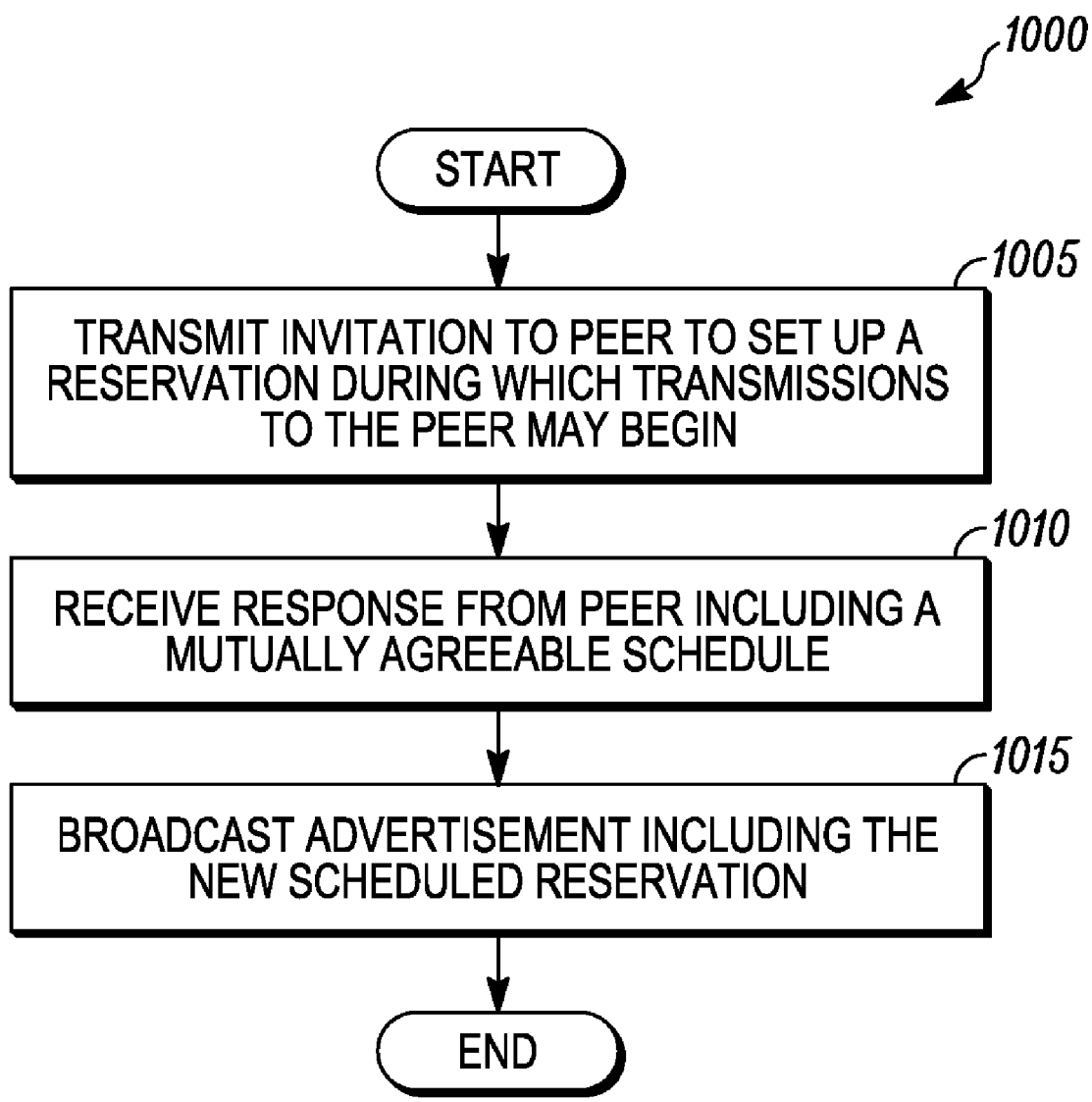

FIG. 10 is a flowchart illustrating an operation 1000 of a mesh device within a mesh network in accordance with some embodiments of the present invention. Specifically, FIG. 10 illustrates the operation 1000 of a mesh device in establishing a reservation within the network.

As illustrated, the operation 1000 begins with Step 1005 in which the mesh device transmits an invitation to at least one other peer node to set up a reservation during which transmissions to the peer may begin. Next, in Step 1010, the mesh device receives a response from the peer including a mutually agreeable schedule. Next in Step 1015, the mesh device broadcasts an advertisement including the new scheduled reservation. The operation then ends.

In summary, the present invention as described provides the following functionality:

1) Access during SMA Reservations:

MPs that have SMA active track Neighborhood SMA reservation times when either they or their neighbors are transmitters or receivers. The access behavior for MPs during the Neighborhood SMA reservation times is described below.

2) Access by SMA Reservation Owners:

If an MP is the owner of a SMA reservation and has a MAC Service Data Unit (MSDU) associated with a SMA session to transmit, it attempts to access the channel during the time set up for the SMA reservation and obtains a Transmission Opportunity (TXOP) using enhanced distributed channel access (EDCA) contention and backoff parameters for the Access Category of the MSDU.

An MP successfully obtains a TxOP when the MP completes a frame exchange with the receiver of the MSDU. If the MP successfully obtains a TxOP, it may transmit until the EDCA TXOP limit for the Access Category of the MSDU is reached. If the MP reaches the TXOP limit before the end of the SMA reservation time, the MP should attempt to transmit additional MSDU(s) associated with the SMA session, if any are ready to be transmitted, by accessing the channel again during the SMA reservation to obtain a subsequent TxOP.

If an MP accesses the channel during the SMA reservation but fails to obtain either an initial or a subsequent TxOP, the MP shall perform a backoff procedure for a retransmission.

After an MP successfully obtains the TxOP, if there are multiple MSDUs to be transmitted, the transmission and retransmission rules for multiple MSDU transmission will use the rules described herein.

When an MP prepares to access the channel for a retransmission outside a SMA reservation, the MP avoids accessing the channel during the neighbor SMA reservation times and neighbor SMA reservation interfering times by setting its Network Allocation Vector (NAV) during these times.

3) Access by non-owners of SMA Reservation:

At the beginning of a SMA reservation not owned by an MP (it is not the transmitter), the MP sets its NAV to the end of the SMA reservation and shall not attempt to access the channel until the end of the SMA reservation.

The present invention as described herein provides a novel method of transmitting frames in a mesh network wherein, a scheduled time for transmitting a frame(s) and an estimated duration for the transmission is advertised by the transmitting and receiving mesh points, an attempt to access the channel and transmit the frame(s) is made starting at the scheduled time and continuing until the frame(s) is either successfully transmitted or a retransmission limit is reached, wherein any attempt to access the channel and transmit a frame(s) is suspended at the scheduled transmissions times of frames by other mesh points and resumed after the estimated duration for transmitting a frame(s) from the other MP has passed.

The present invention performs better in the presence of stations that do not employ scheduled access and needs no protection against transmissions from these stations because it permits mesh points to contend for access to the channel even after the scheduled reservation has passed instead of requiring all scheduled (re)transmissions to be completed within a reserved period. The present invention is significantly simpler to implement than MDA because it uses a single channel access function with a single set of channel access parameters to be used by a mesh point for all transmissions instead of requiring a first channel access function with special retransmission procedure to be used for reserved periods and a second channel access function to be used during non-reserved periods. The present invention also has improved robustness against interference from other mesh devices because it defines scheduled transmission periods during which all mesh points implementing the invention should not access the channel unless they hold a reservation as a transmitter (unique compared to scheduled EDCA).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of operation of a mesh device for communicating within a network comprising:

scheduling a mesh access reservation time period for transmission of one or more scheduled mesh access (SMA) frames by the mesh device on a channel;

performing contention for the channel after the mesh access reservation time period has been scheduled by the mesh device with one or more other mesh devices in the network during the scheduled mesh access reservation time period, wherein performing contention includes disabling transmission until the mesh device determines the channel is clear of all traffic;

starting transmission on the channel of at least one scheduled mesh access (SMA) frame using a channel access function when the mesh device wins the contention for the channel during the scheduled mesh access reservation time period; and completing transmission of the at least one scheduled mesh access frame at a current time period, wherein the current time period comprises one of a time period during the mesh access reservation time period and a time period after the mesh access reservation time period.

2. A method as claimed in claim 1, wherein the performing contention for the channel with one or more other mesh devices in the network during the scheduled mesh access reservation time period comprises performing contention for the channel using the channel access function during the scheduled mesh access reservation time period.

3. A method as claimed in claim 1, further comprising prior to the scheduled mesh access reservation time period:

obtaining one or more frames to transmit starting at the scheduled mesh access reservation time period.

4. A method as claimed in claim 3, wherein the obtaining step is performed by a scheduled access buffer, and further wherein the obtaining step comprises:

obtaining the one or more frames by the scheduled access buffer from one of a group comprising one or more upper layers and one or more neighboring mesh device.

5. A method as claimed in claim 1, further comprising after the scheduled mesh access reservation time period:

determining whether one or more frames transmitted during the scheduled mesh access reservation time period require retransmission;

continuing to perform contention for the channel with one or more other mesh devices in the network;

determining whether another mesh device has reserved the channel for a time period after the scheduled mesh access reservation time period; and transmitting the one or more frames requiring retransmission when the mesh device wins the contention for the channel and when another mesh device has not reserved the channel for the time period.

6. A method as claimed in claim 5, wherein the performing contention for the channel with one or more other mesh devices in the network during the scheduled mesh access reservation time period comprises performing contention for the channel using a quality of service channel access function during the scheduled mesh access reservation time period; and further wherein the continuing to perform contention for the channel with one or more other mesh devices in the network after the scheduled mesh access reservation time period comprises continuing to perform contention for the channel using the same quality of service channel access function after the scheduled mesh access reservation time period.

7. A method as claimed in claim 1, wherein the scheduling step comprises:

negotiating by the mesh device with one or more other mesh devices to schedule a reservation for the mesh access reservation time period;

establishing a mutually agreed upon mesh access reservation time period; and advertising the scheduled mesh access reservation time period to one or more neighbor mesh devices.

8. A method as claimed in claim 7, wherein the advertising step comprises:

broadcasting a reservation information associated with the scheduled mesh access reservation time period by the mesh device on a management frame.

9. A method as claimed in claim 7, wherein the reservation information comprises a scheduled time and a duration for transmitting the frame.

10. A method as claimed in claim 7, where the advertising step further comprises:

periodically broadcasting by the plurality of mesh devices the reservation information associated with the plurality of mesh access time periods to a one or more neighbor mesh devices.

11. A method as claimed in claim 10, wherein the reservation information comprises a scheduled time and a duration for transmitting the frame.

12. A method as claimed in claim 7, further comprising:

periodically checking for frames to be transmitted at a scheduled start of each of a plurality of scheduled mesh access time periods associated with one or more neighbor mesh devices; and transmitting the frames during the scheduled mesh access time periods.

13. A method as claimed in claim 7, further comprising:

avoiding transmission by the one or more neighbor mesh devices during the scheduled mesh access reservation time period.

14. A method as claimed in claim 13, further comprising:

resuming transmission by the one or more neighbor mesh devices after the scheduled mesh access reservation time period.

15. A method as claimed in claim 1, further comprising:

continuing to transmit the frame on the channel until the frame is either successfully transmitted or a retransmission limit is reached.

16. A method as claimed in claim 1, further comprising:

receiving a schedule including a reservation of a scheduled mesh access reservation time period for each of the one or more received frames;

receiving one or more frames to forward to another destination node from at least one neighbor mesh device;

buffering the received one or more frames;

releasing a buffered frame to a transmit queue of a channel access function at a start of an associated scheduled mesh access reservation time for the buffered frame; and disabling one or more queues with non scheduled mesh access traffic during each of the reserved scheduled mesh access reservation time periods.

17. A method as claimed in claim 1, further comprising when the mesh device does not win the contention for the channel during the mesh access reservation time period:

continuing to perform contention for the channel using the channel access function by the mesh device with one or more other mesh devices in the network at a current time period after the scheduled mesh access reservation time period;

suspending attempts to perform contention using the channel access function when another mesh device has reserved the channel for the current time period;

resuming attempts to perform contention using the channel access function at a future time period in which another mesh device has not reserved the channel and the mesh device wins contention for the channel; and starting transmission of at least one SMA frame using the channel access function when the mesh device wins the contention for the channel and another mesh device has not reserved the channel for the current time period.

18. A method as claimed in claim 1, further comprising at a current time period after the scheduled mesh access reservation time period:

determining whether one or more SMA frames scheduled for transmission during the scheduled mesh access reservation time period remain to be transmitted;

continuing to perform contention for the channel using the channel access function by the mesh device with one or more other mesh devices in the network at the current time period after the scheduled mesh access reservation time period;

suspending attempts to perform contention using the channel access function when another mesh device has reserved the channel for the current time period;

resuming attempts to perform contention using the channel access function at a future time period in which another mesh device has not reserved the channel and the mesh device wins contention for the channel; and starting transmission of the remaining SMA frames using the channel access function when the mesh device wins the contention for the channel and another mesh device has not reserved the channel for the current time period.

19. A method as claimed in claim 17, wherein the continuing to perform contention for the channel with one or more other mesh devices in the network after the scheduled mesh access reservation time period comprises continuing to perform contention for the channel using the channel access function after the scheduled mesh access reservation time period.

* * * * *

UNITED STATES PATENT AND TRADEMARK OFFICE
CERTIFICATE OF CORRECTION

PATENT NO. : 8,270,429 B2  
APPLICATION NO. : 11/844561  
DATED : September 18, 2012  
INVENTOR(S) : Chen et al.

Page 1 of 1

It is certified that error appears in the above-identified patent and that said Letters Patent is hereby corrected as shown below:

On the Title Page, in item (56), under "FOREIGN PATENT DOCUMENTS", in Column 2, Line 3, delete "3/2009" and insert -- 5/2009 --, therefor.

On the Title Page, in item (56), under "OTHER PUBLICATIONS", in Column 2, Lines 1-2, delete "C Zhu .et al..........Ad Hoc Networks-10 pages.".

On Page 2, in item (56), under "OTHER PUBLICATIONS", in Column 1, Line 7, delete "Enhancements)." and insert -- (QoS) Enhancements. --, therefor.

On Page 2, in item (56), under "OTHER PUBLICATIONS", in Column 2, Line 9, delete "10-2010-7066334." and insert -- 10-2010-7006334 --, therefor.

In Column 6, Line 30, delete "like)" and insert -- like). --, therefor.

In Column 7, Line 19, delete "QoS-enabled" and insert -- QoS enabled --, therefor.

In Column 7, Line 38, delete "made" and insert -- made. --, therefor.

In Column 8, Line 1, delete "QoS-enabled" and insert -- QoS enabled --, therefor.

Signed and Sealed this  
Twelfth Day of March, 2013

Teresa Stanek Rea  
*Acting Director of the United States Patent and Trademark Office*